United States Patent
Kang et al.

(10) Patent No.: US 8,854,471 B2
(45) Date of Patent: Oct. 7, 2014

(54) INFRARED SENSOR AND SENSING METHOD USING THE SAME

(75) Inventors: Sung Chul Kang, Seoul (KR); Gi Hun Yang, Gongju-si (KR); Dugan Um, Corpus Christi, TX (US); Dongseok Ryu, Seoul (KR)

(73) Assignees: Korea Institute of Science and Technology, Seoul (KR); Dugan Um, Corpus Christi, TX (US)

( * ) Notice: Subject to any disclaimer, the term of this patent is extended or adjusted under 35 U.S.C. 154(b) by 270 days.

(21) Appl. No.: 13/125,963

(22) PCT Filed: Nov. 13, 2009

(86) PCT No.: PCT/KR2009/006699
§ 371 (c)(1),
(2), (4) Date: Apr. 25, 2011

(87) PCT Pub. No.: WO2011/059127
PCT Pub. Date: May 19, 2011

(65) Prior Publication Data
US 2012/0013745 A1    Jan. 19, 2012

(51) Int. Cl.
*H04N 5/33* (2006.01)
*G06T 7/00* (2006.01)
*G01S 17/02* (2006.01)

(52) U.S. Cl.
CPC ....... *G01S 17/02* (2013.01); *G06T 2207/10048* (2013.01); *G06T 2207/10152* (2013.01); *G06T 7/004* (2013.01)
USPC ........... 348/164; 348/166; 348/370; 348/371; 250/330; 250/332; 345/156; 345/419; 382/103

(58) Field of Classification Search
USPC .......... 250/330, 332; 348/164, 370, 371, 166; 345/156, 419; 382/103
See application file for complete search history.

(56) References Cited

U.S. PATENT DOCUMENTS 8,374,438 B1 * 2/2013 Wagner .................. 382/209
2002/0067287 A1   6/2002 Delcheccolo et al.
(Continued)

FOREIGN PATENT DOCUMENTS

JP      2002-296488 A    10/2002
KR   10-1999-0048343 A    7/1999
(Continued)

OTHER PUBLICATIONS

PCT International Search Report and Written Opinion, with English translation, PCT/KR2009/006699, Nov. 13, 2009, 14 Pages.

*Primary Examiner* — Christopher S Kelley
*Assistant Examiner* — Zhihan Zhou
(74) *Attorney, Agent, or Firm* — Fenwick & West LLP

(57) ABSTRACT

Disclosed herein are an infrared (IR) sensor and a sensing method using the same, in which disturbance by an external luminous object is removed using the IR sensor that irradiates IR light into a sensing area to sense an object, so that the position or distance of the object can be precisely and accurately sensed. An IR sensor includes an illumination unit that irradiates IR light into a sensing area; an image pickup device that obtains an IR image in the sensing area by sensing the IR light incident from the sensing area; and a control unit that controls the emission time at which the illumination unit irradiates the IR light and the pickup time of the image pickup device. In the IR sensor, the control unit includes an illumination controller that controls the emission time of the illumination unit; an image pickup device controller that controls the pickup time of the image pickup device; a memory that stores the IR image obtained by the image pickup device; and an image processor that calculates the position or distance of the object in the sensing area by performing comparison operation processing with respect to an IR image obtained when the illumination unit irradiates the IR light and an IR image obtained when the illumination unit does not irradiate the IR light in the IR images stored in the memory.

8 Claims, 5 Drawing Sheets

(56) References Cited

U.S. PATENT DOCUMENTS

| | | |
|---|---|---|
| 2002/0147534 A1 | 10/2002 | Delcheccolo et al. |
| 2005/0077469 A1 | 4/2005 | Kaushal |
| 2005/0232461 A1* | 10/2005 | Hammoud .................... 382/103 |
| 2005/0239548 A1* | 10/2005 | Ueshima et al. ................ 463/36 |
| 2008/0170800 A1* | 7/2008 | Bergman et al. .............. 382/275 |
| 2009/0226033 A1* | 9/2009 | Sefcik .......................... 382/103 |

FOREIGN PATENT DOCUMENTS

| | | |
|---|---|---|
| KR | 10-2004-0028600 A | 4/2004 |
| KR | 10-2004-0083497 A | 10/2004 |
| KR | 10-0580630 B1 | 5/2006 |

* cited by examiner

INFRARED SENSOR AND SENSING METHOD USING THE SAME

TECHNICAL FIELD

Disclosed herein are an infrared (IR) sensor and a sensing method using the same. More particularly, disclosed herein are an IR sensor and a sensing method using the same, in which disturbance by an external luminous object is removed using the IR sensor that irradiates IR light into a sensing area to sense an object, so that the position or distance of the object can be precisely and accurately sensed.

BACKGROUND ART

As a method for sensing an object or obstacle at a short distance, sensors are widely used in industry. A sensor irradiates infrared (IR) light into a sensing area and measures reflected light so as to sense an object or obstacle in the sensing area.

Recently, there has been developed a technique for measuring the position of an object by obtaining an IR image using an image pickup device. In a method of sensing an object at a short distance through the technique, a certain amount of light is first irradiated into a sensing area through photometric illumination, and the light reflected and returned from an object or obstacle that exists in the sensing area is then filtered through an IR filter, so that an IR image is obtained through an image pickup device. Subsequently, the obtained IR image is analyzed, thereby detecting the position of the object or obstacle that exists in the sensing area.

However, in the related art, in a case where another luminous object exists in the exterior of the sensing area in addition to the photometric illumination, the light irradiated from the photometric illumination is mixed with light generated from the external luminous object. The mixed light is reflected from the object, and the mixed reflected light can be picked up by the image pickup device. Therefore, an IR image by the external object may be recognized as the object that exists in the sensing area, and accordingly, an IR sensor may be erroneously operated.

As an example, when the IR sensor is used outdoor, it is difficult to distinguish an IR image by sunlight from an IR image by photometric illumination. Furthermore, since the sunlight is a strong IR light source, the IR sensor may erroneously recognize the IR image reflected from a long-distance object by the sunlight as the object that exists in the sensing area.

As another example, when the IR sensor is used indoor, it is also difficult to distinguish an IR image by the photometric illumination from an IR image generated by lighting illumination transmitted to window or indoor illumination such as an incandescent or fluorescent lamp. That is, since the IR image generated by the indoor illumination or lighting illumination is included in the IR image obtained through the image pickup device, the IR sensor may erroneously recognize the long-distance object, indoor illumination or lighting illumination as the object that exists in the sensing area.

Accordingly, in the related art, the IR image generated from the external luminous object is mixed with the IR image generated from the photometric illumination. Therefore, the accuracy of sensing an object in a sensing area is degraded, and the IR sensor is necessarily used under illumination conditions limited to minimize influence by an external luminous object.

DISCLOSURE

Technical Problem

Disclosed herein are an infrared (IR) sensor and a sensing method using the same, which can precisely recognize an object that exists in a sensing area by removing an IR image generated by an external luminous object.

Technical Solution

In an aspect, there is provided an infrared (IR) sensor including an illumination unit that irradiates IR light into a sensing area; an image pickup device that obtains an IR image in the sensing area by sensing the IR light incident from the sensing area; and a control unit that controls the emission time at which the illumination unit irradiates the IR light and the pickup time of the image pickup device, wherein the control unit includes an illumination controller that controls the emission time of the illumination unit; an image pickup device controller that controls the pickup time of the image pickup device; a memory that stores the IR image obtained by the image pickup device; and an image processor that calculates the position or distance of the object in the sensing area by performing comparison operation processing with respect to an IR image obtained when the illumination unit irradiates the IR light and an IR image obtained when the illumination unit does not irradiate the IR light in the IR images stored in the memory.

The illumination unit may be a halogen lamp or IR light emitting diode (LED).

The image pickup device may be a charge-coupled device (CCD) or complementary metal-oxide semiconductor (CMOS).

The IR sensor may further include an IR pass filter that filters light incident from the sensing area to transfer light in an IR wavelength band to the image pickup device.

The image processor may calculate the distance between the IR sensor and the object in the sensing area from the amount of reflected light recorded in each pixel of the image pickup device.

The control unit may control two IR images respectively obtained when the IR light is irradiated and when the IR light is not irradiated along a predetermined first time interval to be obtained, and control the two IR images to be again obtained after a predetermined second time interval.

Operations of the illumination unit, the image pickup device, the memory and the image processor may be continuously performed while constituting one period, and the image pickup device may pick up the next IR image while the obtained two IR images are processed by the image processor.

In an aspect, there is provided a sensing method using an IR sensor, the method including (a) obtaining an IR image in a sensing area through an image pickup device in the state that an illumination unit is controlled not to irradiate the IR light; (b) obtaining an IR image in the sensing area through the image pickup device in the state that the illumination unit is controlled to irradiate the IR light; (c) performing comparison operation processing with respect to the IR images obtained in the operations (a) and (b), thereby extracting only an IR image reflected and returned from an object in the sensing area using the IR light irradiated by the illumination unit; and (d) processing the extracted IR image through a control unit, thereby calculating the position of the object in the sensing area.

In another aspect, there is provided a sensing method using an IR sensor, the method including (a) obtaining an IR image in a sensing area through an image pickup device in the state that an illumination unit is controlled to irradiate the IR light; (b) obtaining an IR image in the sensing area through the image pickup device in the state that the illumination unit is controlled not to irradiate the IR light; (c) performing comparison operation processing with respect to the IR images obtained in the operations (a) and (b), thereby extracting only an IR image reflected and returned from an object in the sensing area using the IR light irradiated by the illumination unit; and (d) processing the extracted IR image through a control unit, thereby calculating the position of the object in the sensing area.

The comparison operation processing may be performed with the IR images obtained in the operations (a) and (b) through subtraction.

The operation (d) may further include analyzing the amount of reflected light of the extracted IR images, thereby calculating the distance between the IR sensor and the object in the sensing area.

Advantageous Effects

In an infrared sensor (IR) and a sensing method using the same disclosed herein, although an IR image by an external luminous object is mixed with an IR image by an object in a sensing area, it can be removed through comparative analysis of the mixed IR image, thereby precisely identifying the object in the sensing area regardless of ambient light conditions.

BEST MODE

Exemplary embodiments now will be described more fully hereinafter with reference to the accompanying drawings, in which exemplary embodiments are shown.

Figure 1:
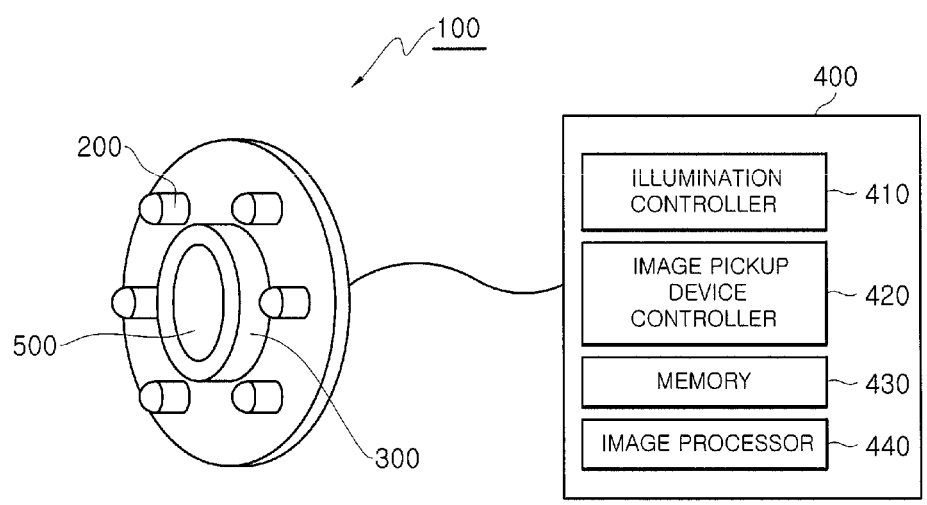
FIG. 1 is a view schematically showing the configuration of an infrared (IR) sensor according to an embodiment.

FIG. 1 is a view schematically showing the configuration of an infrared (IR) sensor according to an embodiment.

Referring to FIG. 1, the IR sensor 100 according to the embodiment includes an illumination unit 200, an image pickup device 300 and a control unit 400. The IR sensor 100 may further include an IR pass filter 500.

The illumination unit 200 irradiates light so as to sense an object that exists in a sensing area. For example, the illumination unit 200 may be, without limitation, a white light source, red light source, halogen lamp or IR LED including an IR wavelength. If illumination including only the IR wavelength is used, the IR sensor 100 can be more effectively operated.

The image pickup device 300 obtains an IR image in the sensing area by sensing IR light incident from the sensing area of the IR sensor 100. Here, the image pickup device 300 picks up the IR image reflected and returned from the object using the IR light irradiated from the illumination unit 200 to the sensing area.

The kind of the image pickup device 300 is not particularly limited, and all image collecting devices that photograph an image in response to light may be used as the image pickup device 300. A charge-coupled device (CCD) or complementary metal-oxide semiconductor (CMOS) may be representatively used as the image pickup device 300. In addition, a device sensitive to an IR wavelength band may be used as the image pickup device 300.

In one embodiment, the IR pass filter 500 is mounted on a front surface of the image pickup device 300, and filters light incident from the sensing area to transfer light in the IR wavelength band to the image pickup device 300. Since the image pickup device 300 generally reacts to various wavelength bands of light, the IR pass filter 500 that can selectively pass only the IR wavelength band is mounted in the front surface of the image pickup device 300, thereby maximizing the sensing effect of the IR sensor 100.

In another embodiment, the IR pass filter 500 may be configured so that only light in the IR wavelength band is passed by applying a direct coating treatment on the lens.

The control unit 400 controls the time of irradiating the IR light of the illumination unit 200 and the pickup time of the image pickup device 300. Specifically, the control unit 400 includes an illumination controller 410, an image pickup device controller 420, a memory 430 and an image processor 440.

The illumination controller 410 controls the time of irradiating the IR light of the illumination unit 200, and the image pickup device controller 420 controls the pickup time of the image pickup device 300. The IR sensor 100 according to the embodiment may obtain an IR image picked up through the image pickup device 300 in the state that light is not irradiated from the illumination unit 200. If necessary, the IR sensor 100 may obtain an IR image picked up through the image pickup device 300 in the state that light is irradiated from the illumination unit 200.

The memory 430 stores the IR image obtained from the image pickup device 300. The memory 430 stores all the IR images picked up in the state that the light is not irradiated from the illumination unit 200 and in the state that the light is irradiated from the illumination unit 200 as described above.

The image processor 440 calculates the position or distance of an object in the sensing area by performing comparison operation with respect to the IR image obtained when IR light is irradiated from the illumination unit 200 and the IR image obtained when IR light is not irradiated from the illumination unit 200 in the IR images stored in the memory 430.

IR images generated by the illumination unit 200 and an external luminous object are mixed in the IR image obtained when the IR light is irradiated from the illumination unit 200. The IR image obtained when the IR light is not irradiated from the illumination unit 200 is an IR image generated from the external luminous object. Thus, if the two IR images are analyzed, the IR image sensed by only the IR light generated from the illumination unit 200 can be extraced.

Figure 2:
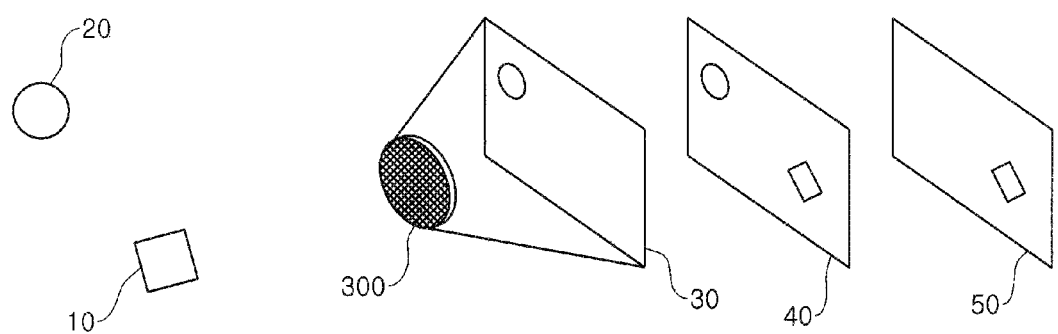
FIGS. 2 and 3 are views illustrating a process of obtaining an IR image using the IR sensor according the embodiment.
Figure 3:
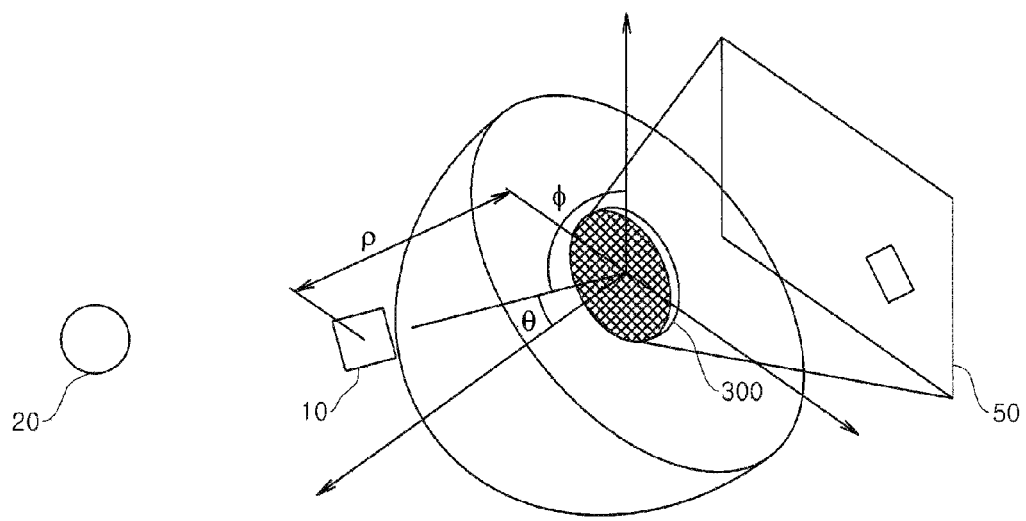

FIGS. 2 and 3 are views illustrating a process of obtaining an IR image using the IR sensor according to the embodiment.

Referring to FIG. 2, an IR image 30 obtained through the image pickup device 300 in the state that the illumination unit 200 does not emit light includes IR information by an external luminous object 20.

An IR image 40 obtained through the image pickup device 300 in the state that the illumination unit 200 emits light includes IR information reflected and returned from a short-distance object 10 using IR light irradiated from the illumination unit 200 in addition to the IR information by the external object 20.

Thus, if subtraction is performed by performing comparison operation with respect to the IR image 40 obtained in the state that the illumination unit 200 emits light and the IR image 30 obtained in the state that the illumination unit 200 does not emit light, an IR image 50 can be obtained. Here, the IR image 50 is obtained by removing the IR information by the external object 20 and extracting only the IR information by the illumination unit 200. In addition to the subtraction, various comparison operation processing methods such as Exclusive OR may be used as the comparison operation method.

Meanwhile, if various pre-processing techniques are performed with respect to the obtained two IR images 30 and 40 and the subtraction is then performed, the IR image 50 having the information of the short-distance object 10 can be more precisely extracted.

For example, in a case where the IR sensor 100 itself moves, the IR information by the external luminous object 20 in the IR image 30 may be slightly different from that in the IR image 40 due to the different of times at which the two IR images 30 and 40 are obtained. Accordingly, a temporal error may occur at an interface of the short-distance object 10 in the IR image 50 obtained by performing the subtraction.

As a method of compensating for the temporal error, a pre-processing technique is performed by applying morphology dilation operation to the IR image 30 having the information of the external luminous object 20 and extending the IR area of the external luminous object 20 so that a temporal error is sufficiently considered. If the subtraction is performed posterior to the pre-processing technique, it is possible to compensate for the error caused by a time lag between two IR images 30 and 40.

As another method of compensating for the temporal error, a pre-processing technique may be performed by applying morphology erosion operation to the IR image 40 having the information of the external luminous object 20 and the short-distance object 10, and the subtraction may be then performed.

If the IR image 50 having only the information of the short-distance object is extracted by applying various pre-processing techniques, comparison operation and the post-processing to the two IR images 30 and 40 will improve the reliability of the IR sensor.

Subsequently, the method of calculating the position or distance of the object 10 in the sensing area by removing the IR information by the external luminous object 20 and analyzing the IR image 50 having only the IR information reflected and returned from the object using the light generated by the illumination unit 200 will be described in detail with reference to FIG. 3.

Referring to FIG. 3, the IR light irradiated from the illumination unit 200 to the sensing area is reflected from the short-distance object 10, and the reflected IR light is received to the image pickup device 300. Here, the amount of light reflected from the object 10 will vary depending on the surface angle of the object 10, the material of the object 10, the distance between the object 10 and the IR sensor 100.

Thus, the information recorded in each pixel of the image pickup device 300 is analyzed, so as to derive various pieces of information of the object 10 that exists in the sensing area. Since the amount of light reflected from the object 10 is generally in inverse proportion to the square of distance, the distance $\rho$ between the IR sensor 100 and the object 10 can be derived from the amount of light recorded in each pixel.

Further, the coordinate of a pixel having reflected light recorded therein is analyzed in consideration of the pixel condition of the image pickup device 300 and the lens effect of the image pickup device 300, so as to calculate the directions $\theta$ and $\Phi$ of the object 10 with respect to the IR sensor 100. As a result, the three factors of the distance $\rho$ and the directions $\theta$ and $\Phi$ are determined by applying a spherical coordinate system to a three-dimensional space, so as to calculate the relative position between the IR sensor 100 and the object 10.

Figure 4:
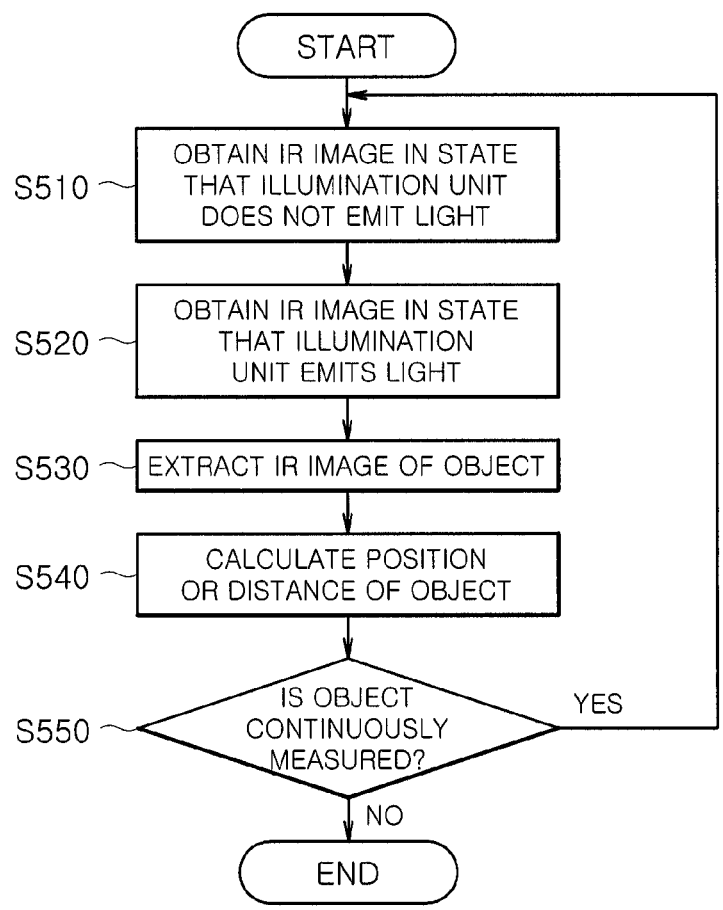
FIG. 4 is a flowchart illustrating a sensing method using an IR sensor according to an embodiment.

FIG. 4 is a flowchart illustrating a sensing method using an IR sensor according to an embodiment.

Referring to FIG. 4, in the state that the illumination unit 200 is controlled not to irradiate IR light, an IR image 30 by an external luminous object 20 is obtained through the image pickup device 300 (S510). In the practical operation of the IR sensor 100 according to the embodiment, if light is emitted for a relatively shorter time than the pickup time of the image pickup device 300 even if the illumination unit 200 emits light at the S510 due to an error under the control, processing can be performed so that the emitted light has no influence on the sensed result.

Subsequently, in the state that the illumination unit 200 is controlled to irradiate IR light, an IR image 40 is obtained through the image pickup device 300 (S520). The IR image 40 obtained at the S520 includes information by the external luminous object 20 and the illumination unit 200.

Meanwhile, the order of the S510 and the S520 may be reversed.

Next, comparison operation is performed with respect to the IR images 30 and 40 obtained at the S510 and the S520 through the control unit 400, thereby extracting only an IR image reflected and returned from an object 10 in a sensing area using the IR light irradiated by the illumination unit 200 (S530). Here, the aforementioned subtraction may be used to perform the comparison operation.

Subsequently, the control unit 400 calculates the position of the object 10 in the sensing area by processing the extracted IR image 50. Alternatively, the control unit may calculate the distance between the IR sensor 100 and the object 10 in the sensing area by analyzing the amount of reflected light of the extracted IR image 50 (S540).

Next, the aforementioned operations are repeated in a case where it is desired to continuously measure the object 10 in the sensing area, and otherwise, the measurement is finished (S550).

Figure 5:
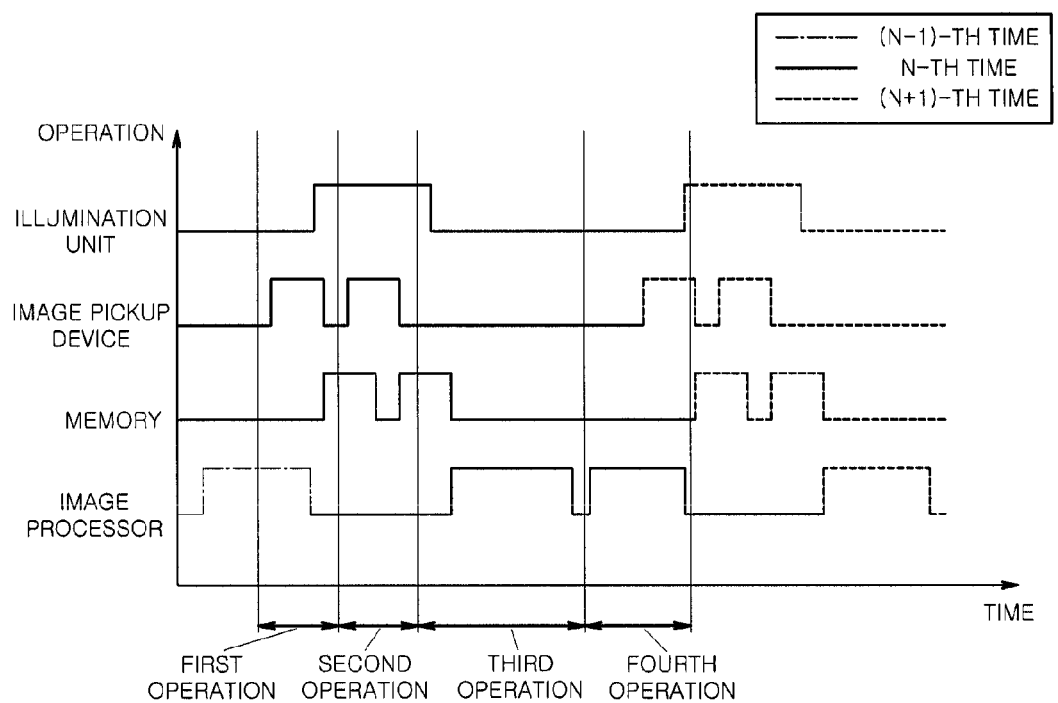
FIG. 5 is a graph illustrating a method of operating the IR sensor based on the flowchart illustrated in FIG. 4.

FIG. 5 is a graph illustrating a method of operating the IR sensor based on the flowchart illustrated in FIG. 4.

In FIG. 5, since first, second, third and fourth operations described on the horizontal axis are operations arbitrarily divided according to the time interval at which each unit of the IR sensor 100 is operated, their order may be modified, or the time interval may be changed.

Referring to FIG. 5, the driving of the IR sensor 100 in an N-th time will be described. The illumination unit 200 operates in response to a control signal of the illumination controller 410 and mainly emits light in the second operation.

The image pickup device 300 operates in response to a control signal of the image pickup device controller 420 and mainly operates in the first and second operations. The emission time of the illumination unit 200 has a close relation with the pickup time of the image pickup device 300.

That is, in the first operation, the image pickup device 200 picks up the sensing area for the time interval at which the illumination unit 200 does not emit light so as to obtain the IR image 30 in the state that the illumination unit 200 does not emit light. Subsequently, in the second operation, the image pickup device 300 picks up the sensing area in the state that the illumination unit 200 emits light. Here, the first and second operations may be reversed.

The difference between times of the IR image in the state that the illumination unit 200 emits light and the IR image in the state that the illumination does not emit light is necessarily minimized so that it is possible to measure a reliable three-dimensional depth of a dynamic obstacle. The difference between the times may be maintained within a few millimeters (ms). Thus, after the pickup of the image pickup device 300 is finished in the first operation, the control unit 400 controls the image pickup in the second operation to be started in a predetermined first time interval, so as to obtain the two IR images 30 and 40 of which time interval is minimized.

After the pickup of the image pickup device 300 is finished in the second operation, the control unit 400 controls the pickup of the image pickup device 300 to be again started in a predetermined second time interval. The second time interval is minimized, so that the continuous measurement of an obstacle can be rapidly performed. By repeatedly performing the processes of the first to fourth operations, it is possible to perform the continuous measurement of the obstacle.

Generally, although the second time interval is minimized, it is more than two times greater than the first time interval. If a pickup for the next processing period is performed while image processing is performed in the third or fourth operation, the second time interval can be minimized.

If the pickup time of the image pickup device 300 is finished, the memory 430 stores the IR images 30 and 40 obtained through the image pickup device 300.

The image processor 440 extracts only the IR image 50 by the illumination unit 200 by performing comparison operation processing with respect to the IR images 30 and 40 stored in the memory 430 in the third operation. Next, the image processor 440 calculates the position or distance of the object 10 in the sensing area by analyzing the IR image 50 extracted in the third operation.

By repeatedly performing the first to fourth operations described above, the object 10 in the sensing area can be continuously measured. In this case, before the fourth operation in the N-th time is finished, the first operation in an (N+1)-th time may be started, thereby minimizing the operational period of the IR sensor 100.

Through the aforementioned processes, the IR sensor 100 according to the embodiment can extract only information reflected from the object 10 using IR light irradiated from the illumination unit 200 by removing IR information generated from the external luminous object 20.

Although the preferred embodiments disclosed herein have been disclosed for illustrative purposes, those skilled in the art will appreciate that various modifications, additions and substitutions are possible, without departing from the scope and spirit of the disclosure as disclosed in the accompanying claims.

The invention claimed is:

1. An infrared (IR) sensor that irradiates IR light into a sensing area to sense an object, the IR sensor comprising:
    an illumination unit that irradiates the IR light into the sensing area;
    an image pickup device that obtains an IR image in the sensing area by sensing the IR light incident from the sensing area; and
    a control unit that controls the emission time at which the illumination unit irradiates the IR light and the pickup time of the image pickup device,
    wherein the control unit comprises:
        an illumination controller that controls the emission time of the illumination unit;
        an image pickup device controller that controls the pickup time of the image pickup device;
        a memory that stores the IR image obtained by the image pickup device; and
        an image processor that calculates the distance of the object in the sensing area from the IR sensor by performing comparison operation processing with respect to a first IR image obtained when the illumination unit does not irradiate the IR light and a second IR image obtained when the illumination unit irradiates the IR light in the IR images stored in the memory,
    wherein the distance is calculated from the amount of reflected light recorded in each pixel of the image pickup device,
    wherein the image processor performs pre-processing for compensating a temporal error between the first IR image and the second IR image prior to the comparison operation processing,
    wherein the first IR image is obtained in a first operation and the second IR image is obtained in a second operation, the second operation beginning immediately after the first operation is finished,
    wherein the illumination unit starts the irradiation of the IR light before the first operation is finished and finishes the irradiation of the IR light after the second operation is finished,
    wherein an irradiation time of the IR light during the first operation is shorter than a pickup time of the first IR image, and
    wherein a total irradiation time of the IR light is longer than a time interval between a pickup time of the first IR image and a pickup time of the second IR image.

2. The IR sensor according to claim 1, wherein the illumination unit is a halogen lamp or IR light emitting diode (LED).

3. The IR sensor according to claim 1, wherein the image pickup device is a charge-coupled device (CCD) or complementary metal-oxide semiconductor (CMOS).

4. The IR sensor according to claim 1, further comprising an IR pass filter that filters light incident from the sensing area to transfer light in an IR wavelength band to the image pickup device.

5. The IR sensor according to claim 1, wherein the control unit controls the first IR image and the second IR image along a predetermined first time interval to be obtained, and controls the first IR image and the second IR image to be again obtained after a predetermined second time interval.

6. The IR sensor according to claim 5, wherein operations of the illumination unit, the image pickup device, the memory and the image processor are continuously performed while constituting one period, and the image pickup device picks up the next IR image while the obtained first IR image and the second IR image are processed by the image processor.

7. A sensing method using an IR sensor comprising an illumination unit that irradiates IR light into a sensing area, an image pickup device that obtains an IR image in the sensing area, and a control unit that controls the emission time of the illumination unit and the pickup time of the image pickup device, the method comprising:
    (a) obtaining a first IR image in the sensing area through the image pickup device in the state that the illumination unit is controlled not to irradiate the IR light;
    (b) obtaining a second IR image in the sensing area through the image pickup device in the state that the illumination unit is controlled to irradiate the IR light;

(c) performing pre-processing for compensating a temporal error between the first IR image and the second IR image;

(d) performing comparison operation processing with respect to the first IR image and the second IR image, thereby extracting only an IR image reflected and returned from the object in the sensing area using the IR light irradiated by the illumination unit; and (e) processing the extracted IR image through the control unit, thereby calculating the distance of the object in the sensing area from the IR sensor by the amount of reflected light recorded in each pixel of the image pickup device, wherein the first IR image is obtained in a first operation and the second IR image is obtained in a second operation, the second operation beginning immediately after the first operation is finished, wherein the illumination unit starts the irradiation of the IR light before the first operation is finished and finishes the irradiation of the IR light after the second operation is finished, wherein an irradiation time of the IR light during the first operation is shorter than a pickup time of the first IR image, and wherein a total irradiation time of the IR light is longer than a time interval between a pickup time of the first IR image and a pickup time of the second IR image.

8. The method according to claim 7, wherein the comparison operation processing is performed with the first IR image and the second IR image obtained in the operations (a) and (b) through subtraction.

\* \* \* \* \*